(12) United States Patent
Hayashi

(10) Patent No.: US 6,695,339 B2
(45) Date of Patent: Feb. 24, 2004

(54) VEHICLE OCCUPANT PROTECTION DEVICE

(75) Inventor: Shinji Hayashi, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/156,857

(22) Filed: May 30, 2002

(65) Prior Publication Data

US 2002/0180187 A1 Dec. 5, 2002

(30) Foreign Application Priority Data

May 30, 2001 (JP) ........................................ 2001-162833

(51) Int. Cl.[7] ........................... B60R 21/16; B60R 22/22
(52) U.S. Cl. ................................. 280/728.3; 280/730.1
(58) Field of Search ............................ 280/728.3, 730.1

(56) References Cited

U.S. PATENT DOCUMENTS

| 5,398,959 A | | 3/1995 | Avila | |
|---|---|---|---|---|
| 5,588,669 A | * | 12/1996 | Leonard et al. | ........... 280/728.3 |
| 6,394,486 B1 | * | 5/2002 | Fujimura et al. | ......... 280/728.2 |

FOREIGN PATENT DOCUMENTS

| JP | 405270339 A | * | 10/1993 | ........... B60R/21/20 |
|---|---|---|---|---|
| JP | 405319197 A | * | 12/1993 | ........... B60R/21/20 |
| JP | 7-156738 | | 6/1995 | |
| JP | 407329677 A | * | 12/1995 | ........... B60R/21/20 |
| JP | 11-115670 | | 4/1999 | |
| JP | 2000264159 A | * | 9/2000 | ........... B60R/21/20 |
| JP | 2000344041 A | * | 12/2000 | ........... B60R/21/20 |
| JP | 2001039251 A | * | 2/2001 | ........... B60R/21/20 |
| JP | 2002002434 A | * | 1/2002 | ........... B60R/21/20 |
| JP | 02002337653 A | * | 11/2002 | ........... B60R/21/22 |

* cited by examiner

Primary Examiner—Son T Nguyen
(74) Attorney, Agent, or Firm—Kanesaka & Takeuchi

(57) ABSTRACT

A vehicle occupant protection device has an airbag, a gas generator for inflating the airbag and a door that opens when a airbag is inflated. The door is provided with a pair of sidewall portions on a backside of the door. Each sidewall portion has a stopper for limiting an opening angle of the door during the inflation of the airbag. When the airbag is inflated and the door opens, the stopper abuts against a backside of a cover, thereby keeping the door from further opening. Also, upon the inflation of the air bag, the sidewall portions are brought and project to a front side of the cover together with the door, thereby limiting the inflation of the airbag in a lateral direction.

7 Claims, 4 Drawing Sheets occupant's leg occupant's leg

//VEHICLE OCCUPANT PROTECTION DEVICE

BACKGROUND OF THE INVENTION AND RELATED ART STATEMENT

The present invention relates to a vehicle occupant protection device, more particularly, to a vehicle occupant protection device suitably used as a leg protection device for protecting vehicle occupant's legs from colliding with a vehicle member, such as an interior panel, in front of a vehicle seat in if the event of a vehicle collision.

As the vehicle occupant protection device for protecting the vehicle occupant from colliding with the interior panel in the event of the collision of the vehicle, there is a protection device having mainly an airbag installed inside the interior panel or in a space behind the interior panel, a gas generator for inflating the airbag and a cover for covering the airbag in a normal state (when the vehicle is not in a situation like the collision).

In the aforementioned vehicle occupant protection device, the airbag is folded and accommodated inside the interior panel and the cover is disposed to cover the folded airbag.

In the event of the vehicle collision, the gas generator is actuated to spout out gas. The gas is supplied into the airbag so as to rapidly inflate the airbag. Upon the inflation of the airbag, the cover is opened so as to allow the airbag to expand out of the interior panel. Therefore, the airbag is inflated and deployed between the interior panel and the vehicle occupant, thereby protecting the vehicle occupant from colliding with the interior panel.

An example of the vehicle occupant protection device of this type will be described with reference to FIG. 5. FIG. 5 is a sectional view showing an example of the vehicle occupant protective device for a front passenger installed in the automobile. The vehicle occupant protection device is in a state that the airbag is inflated.

A vehicle occupant protection device 100 of the automobile comprises a container-like retainer 102 having an opening formed in its front face (facing a vehicle occupant), an airbag 104 folded and accommodated in the retainer 102, a gas generator 106 for inflating the airbag 104 and a cover door 108 for covering the opening formed in a front face of the retainer 102 and for creating an opening when the airbag 104 is inflated. The cover door 108 is pivotally supported at its lower edge by a hinge 116. In a normal state, the cover door 108 is arranged to be substantially flush with an interior panel 112 for closing the opening 114.

In the vehicle occupant protection device 100, the gas generator 106 is actuated to spout out the gas in the event of the vehicle collision. The airbag 104 is inflated by the gas from the gas generator 106 to push up and open the cover door 108 so that the airbag 104 is deployed in front of the vehicle occupant, thereby receiving the upper half of the vehicle occupant.

The cover door is supported by the airbag 104 and is positioned in front of knees of the vehicle occupant, thereby preventing the lower legs of the vehicle occupant from colliding with the interior panel 112. That is, when the airbag 104 is inflated, the cover door 108 is pushed out toward the vehicle occupant by the gas pressure during the inflation of the airbag 104 and comes in contact with the knees of the vehicle occupant. Therefore, a load locally applied by the knees of the vehicle occupant is dispersed by the cover door 108 and is then transmitted to the airbag 104, whereby the airbag 104 effectively absorbs the load from the vehicle occupant to receive and stop the lower legs of the vehicle occupant.

An upper portion of the cover door 108 is connected to the retainer 102 by a connecting member 118, thereby preventing the cover door 108 from excessively projecting toward the vehicle occupant or from coming off by the rapid inflation of the airbag 104.

In the vehicle occupant protection device 100, the connecting member 118 as pivotal movement limiting means of the cover door 108 has two rods 118a and 118b. Each end of the rods 118a and 118b is pivotally connected with each other, and the other end of the rod 118a is pivotally connected to the retainer 102, and the other end of the other rod 118b is pivotally connected to the cover door 108. This structure increases the number of parts and thus increases a cost. In a normal state, a pair of the rods 118a, 118b of the connecting member 118 is closed in a V-shape. During assembly, a part of the airbag may be caught between the rods 118a and 118b in a step of closing the rods 118a, 118b. Accordingly, the device does not provide a good operability.

Further, since the connecting member 118 is located near an upper edge of the cover door 108, the airbag 104 is easily caught by the connecting member 118 while expanding from a bottom side.

It is an object of the present invention to solve the aforementioned problems and to provide a vehicle occupant protection device that has a simple structure, can be easily assembled, and allows extremely smooth inflation of the airbag.

Further objects and advantages of the invention will be apparent from the following description of the invention.

SUMMARY OF THE INVENTION

A vehicle occupant protection device of the present invention includes an airbag disposed inside a vehicle member in front of a seat of a vehicle; a gas generator for inflating the airbag; a door substantially flush with the vehicle member for covering the airbag and creating an opening in the vehicle member through which the airbag passes toward the vehicle occupant with its one side as a hinge member when the airbag is inflated; and limiting means for limiting an opening angle of the door. The limiting means is composed of stoppers that contact a backside of the peripheral edge of the opening when the door is opened by a predetermined angle. The stoppers are disposed on sidewalls of the door extending in a direction perpendicular to the sidewalls.

In the vehicle occupant protection device, when the door is opened by the inflated airbag, the stoppers contact the backside of the peripheral edge of the opening, thereby preventing the door from further opening.

The stoppers are disposed on the door and can be easily formed as an integrated part with the door, for example, by molding a synthetic resin.

In the present invention, each of the stoppers has a plate portion and rib portions. The plate portion projects laterally from a saidwall of the door, and comes to contact the backside of the peripheral edge of the opening. The rib portions support the plate portion. In the stopper with this structure, the strength and rigidity of the stopper can be designed with a great flexibility by selecting the shapes of the plate portion and the rib portions, and the number of the rib portions.

The vehicle occupant protection device of the present invention is extremely suitable to a leg protection device for protecting a vehicle occupant's legs by the inflated airbag, and can be used as an airbag device for protecting a front passenger or a rear passenger.

DETAILED DESCRIPTION OF PREFERRED EMBODIMENTS

Figure 1:
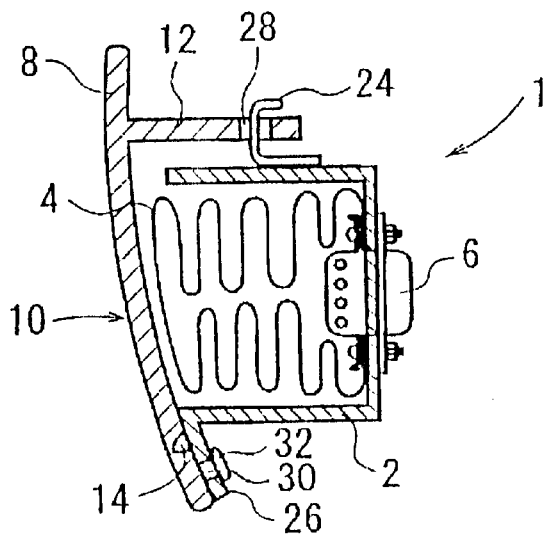
FIG. 1 is a sectional view showing a leg protection device for a front passenger of an automobile according to an embodiment of the present invention.
Figure 2:
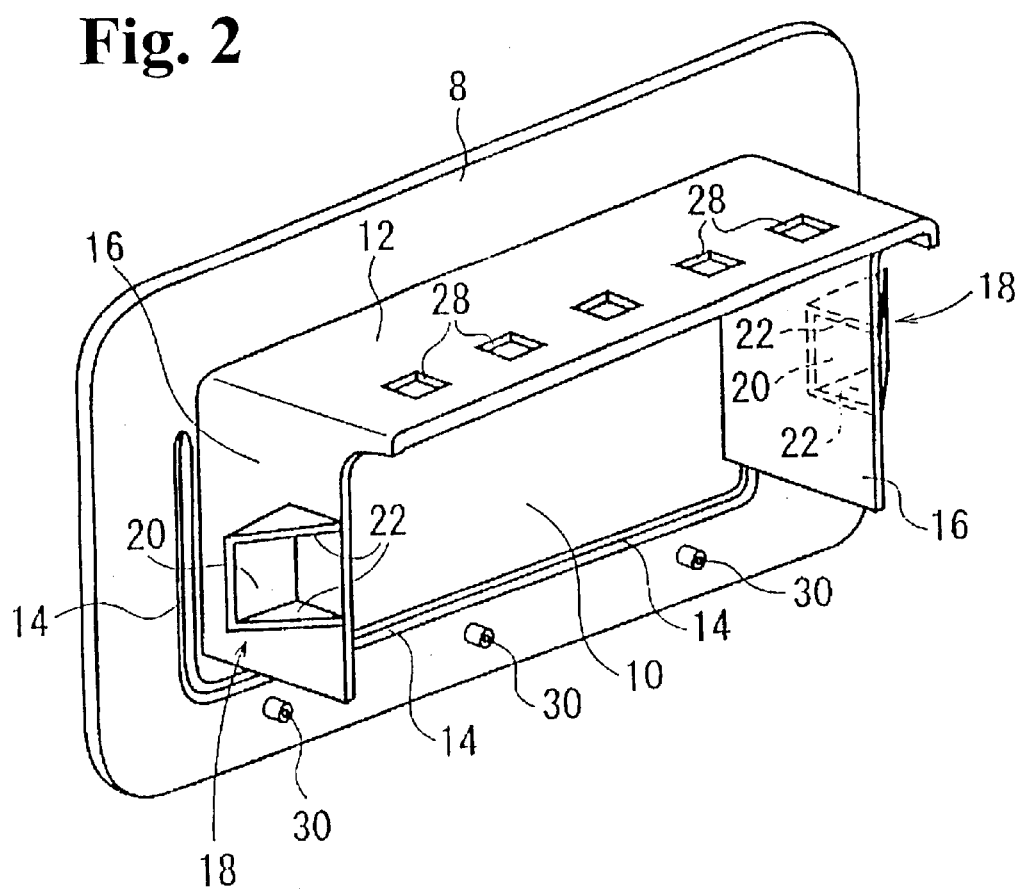
FIG. 2 is a perspective view of a cover of the protection device shown in FIG. 1.
Figure 3A:
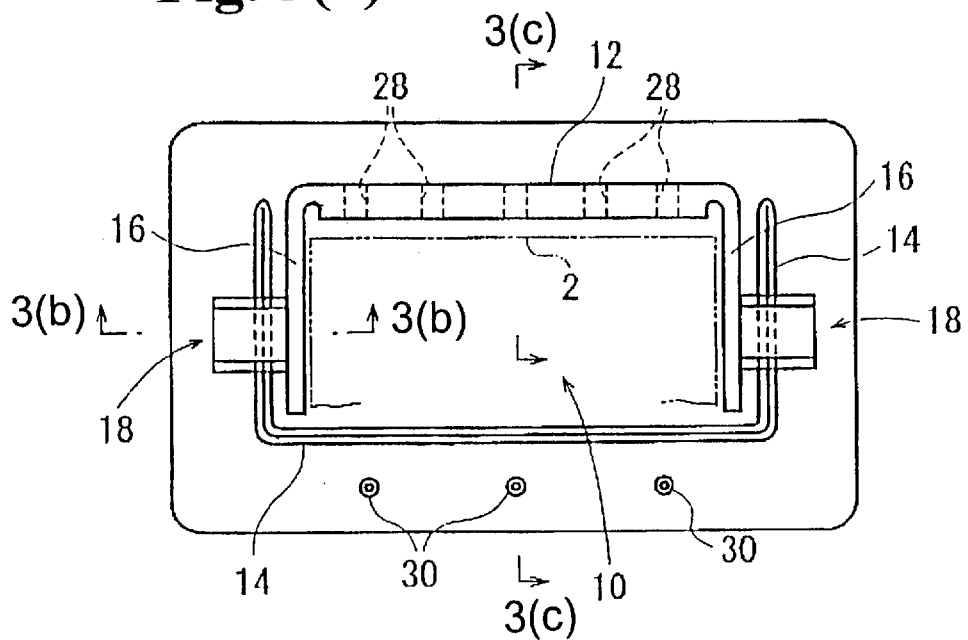
FIG. 3(a) is a plan view of the cover of the protection device shown in FIG. 1.
Figure 3B:
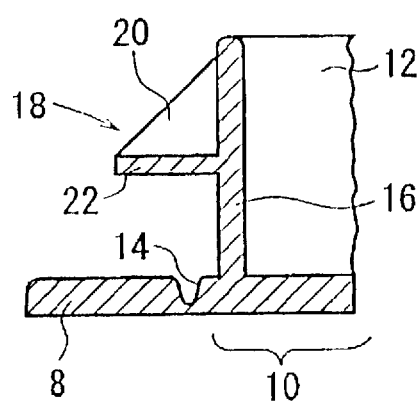
FIG. 3(b) is a sectional view taken along line 3(b)—3(b) in FIG. 3(a) and FIG. 3(c) is a sectional view taken along line 3(c)—3(c) in FIG. 3(a)
Figure 3C:
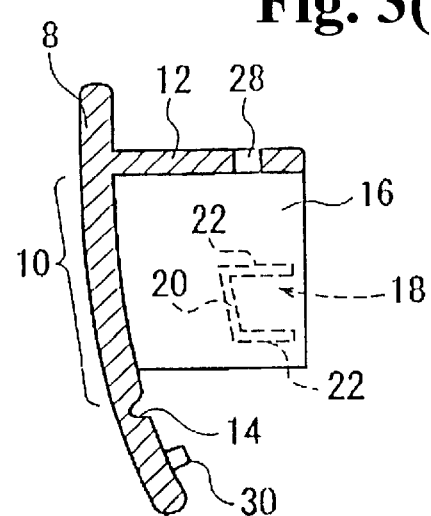
Figure 4A:
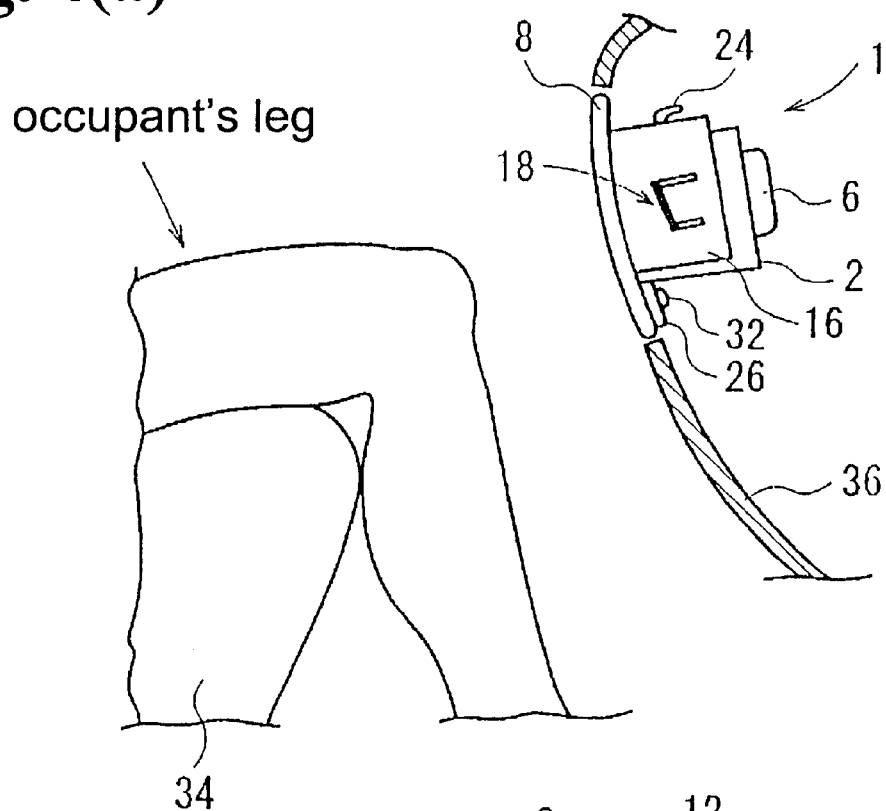
FIG. 4(a) is a sectional view showing the protection device.
Figure 4B:
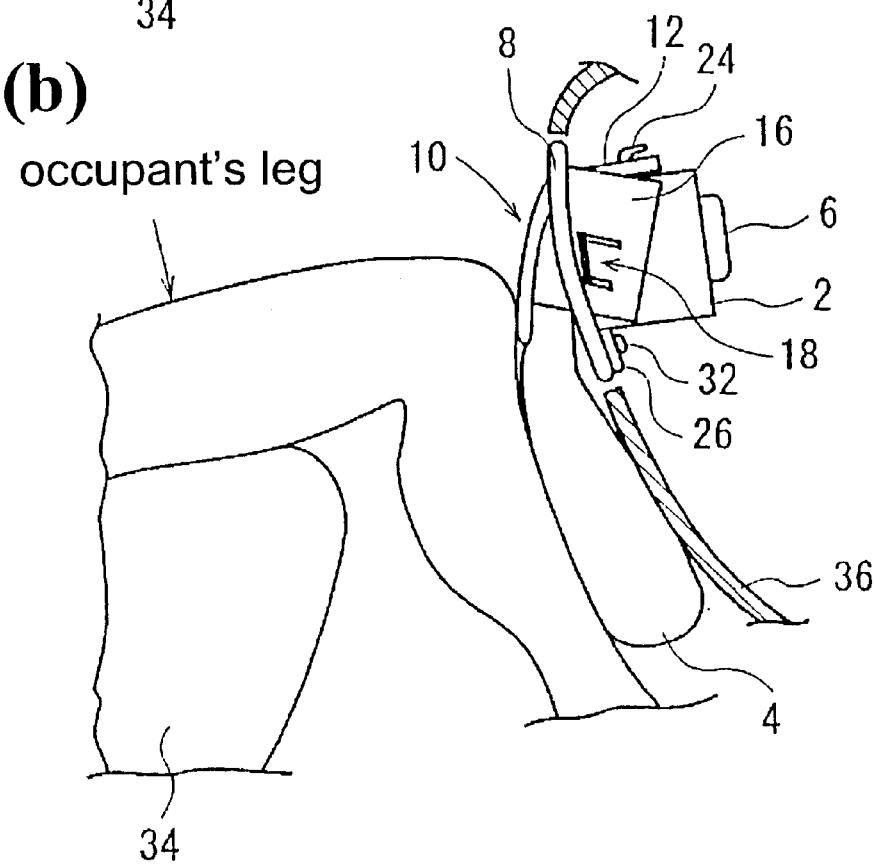
FIG. 4(b) is a sectional view of the protection device in a state that an airbag is inflated.
Figure 5:
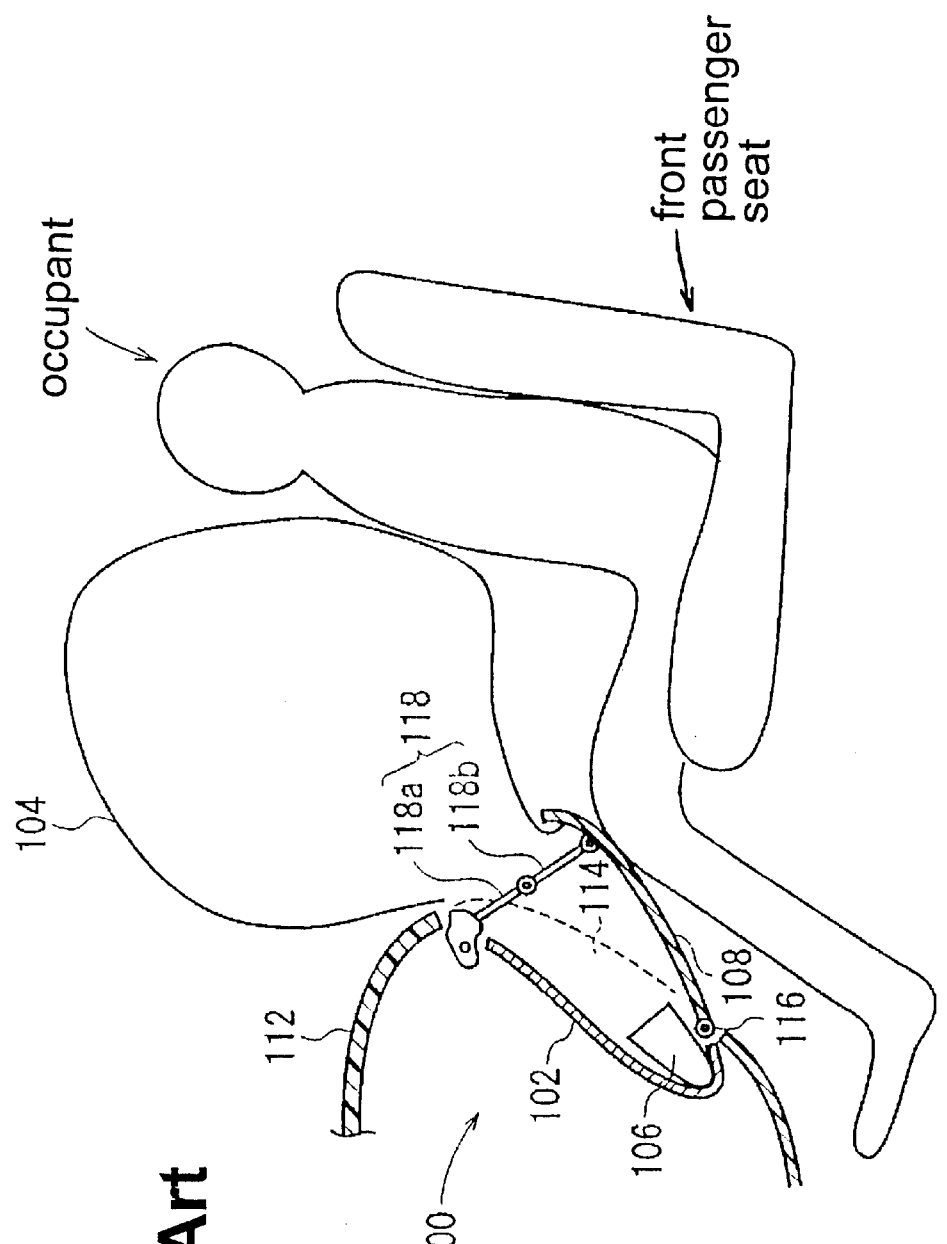
FIG. 5 is a sectional view of a vehicle occupant protection device according to a conventional example in a state that an airbag is inflated.

Hereunder, embodiments of the present invention will be explained with reference to the accompanied drawings. FIG. 1 is a sectional view showing a leg protection device for a front passenger of an automobile according to an embodiment of the present invention, FIG. 2 is a perspective view of a cover of the protection device, FIG. 3(a) is a plan view of the cover, FIG. 3(b) is a sectional view taken along line 3(b)—3(b) in FIG. 3(a), FIG. 3(c) is a sectional view taken along line 3(c)—3(c) in FIG. 3(a), FIG. 4(a) is a sectional view showing the installation of the protection device in a normal state and FIG. 4(b) is a sectional view of the protection device in a state that an airbag is inflated.

A leg protection device 1 for a front passenger of an automobile has a container-like retainer 2 having an opening formed in its front side (facing the passenger); an airbag 4 folded and accommodated in the retainer 2; a gas generator 6 for inflating the airbag 4; and a cover 8 covering the opening of the retainer 2. A part of the cover 8 is defined as a door 10 that opens when the airbag 4 is inflated. The cover 8 is attached to the retainer 2 so that the door 10 overlaps the opening of the retainer 2.

On a backside of the cover 8, there are disposed a wall portion 12 extending laterally along an upper edge of the door 10, and a groove-like tear line (an easy split portion) 14 extending along lower, left and right side edges of the door 10. When gas generated from the gas generator 6 inflates the airbag 4, the gas pressure pushes the door 10 during the inflation of the airbag 4, whereby the tear line 14 is torn along the lower, left and right side edges of the door 10. At this point, the door 10 is bent along its upper edge with a corner to the wall portion 12 as a hinge, so that the lower portion of the door 10 opens beyond a front side of the cover 8.

It is preferable that the tear line 14 extending along the left and right side edges of the door 10 has a groove deeper than that of the tear line 14 extending along the lower edge of the door 10. Through this structure, the tear line 14 may be extremely smoothly torn from the lower edge of the door 10 to the left and right side edges of the door 10.

A pair of sidewall portions 16 is disposed on a backside of the door 10 to extend vertically along the left and right side edges of the door 10. Each of the sidewall portions 16 has a stopper 18 for limiting an opening angle of the door 10 during the inflation of the airbag 4. The stopper 18 is formed on an outer side surface of the sidewall portion 16 to project laterally. Also, the stopper 18 has a plate portion 20 that can abut against the backside of the cover 8 at the edge portion around the door 10 when the door 10 opens beyond the cover 8 and rib portions 22 supporting the plate portion 20. The plate portion 20 is located at a position away from the backside of the cover 8 by a predetermined distance in an extension direction of the sidewall portion 16.

When the stopper 18 is formed, a strength and rigidity thereof, which correspond to an output of the gas generator 6 and the like, can be controlled by selecting the shapes of the plate portion 20 and the rib portions 22, the number of the rib portions 22 and the like.

When the airbag 4 is inflated and the door 10 opens to the front side of the cover 8, the sidewall portions 16 are brought to the front side of the cover 8 together with the door 10. The stoppers 18 move toward the backside of the cover 8 together with the sidewall portions 16. When the stoppers 18 move the predetermined distance, the plate portions 20 abut against the backside of the cover 8, thereby stopping the door 10 from further opening. The opening angle of the door 10 is thereby limited.

When the door 10 opens in the predetermined opening angle, the airbag 4 is deployed to the front side of the cover 8 through a frame-like opening surrounded by the door 10 and the left and right sidewall portions 16, and is guided downward by the door 10 to expand. At this time, the left and right sidewall portions 16 projecting to the front side of the cover 8 limit a lateral expansion of the airbag 4.

The retainer 2 is provided with hooks 24 on an upper surface to be connected to the cover 8. In addition, the retainer 2 is provided with a lug or flange 26 at a lower edge of the opening thereof to be fixed to the cover 8. The lug 26 is formed in an outward collar-like shape projecting from the lower edge of the opening of the retainer 2, so that the lug 26 overlaps a backside of a portion just below the door 10 of the cover 8. The lug 26 has small holes formed therein.

The wall portion 12 is provided with holes 28 with which the hooks 24 can engage. Cylindrical pins 30 capable of penetrating the holes of the lug 26 are formed on the backside of a portion just below the door 10 of the cover 8 that the lug 26 overlaps.

When mounting the cover 8 to the retainer 2, the hooks 24 on the upper surface of the retainer 2 are inserted into the holes 28 from below the wall portion 12 to engage the holes 28. Then, the opening of the retainer 2 is superposed on the door 10, and the lug 26 below the opening of the retainer 2 overlaps the backside of the portion just below the door 10 of the cover 8.

At this time, the pins 30 penetrate the small holes of the lug 26, thereby achieving an alignment between the retainer 2 and the cover 8. After that, screws 32 are inserted into central bores of the pins 30, thereby securing the lug 26 to the cover 8. It should be noted that the lug 26 might also be fastened to the cover 8 by melting ends of the pins 30 to enlarge the ends. Accordingly, the cover 8 is fixed to the retainer 2, thereby completing the mounting of the cover 8.

The protection device 1 having the aforementioned structure is inserted through a device-mounting opening formed on an interior panel 36 in front of a front passenger seat 34 and secured to a vehicle member (not shown) by securing means, such as a bracket (not shown), whereby the protection device 1 is installed inside an interior panel 36 (a space behind the interior panel 36). The device-mounting opening is located almost at the same height level as knees of the vehicle occupant on the front passenger seat. The cover 8 of the protection device 1 is disposed to close the device-mounting opening in such a manner as to be flush with the interior panel 36 in a normal state.

In the event of the vehicle collision, the gas generator 6 is activated to spout out the gas and the airbag 4 starts to be inflated by the gas from the gas generator 6 to push and open the door 10 of the cover 8, so that the airbag 4 expands to the front side of the interior panel 36. At this point, the door 10 opens by the predetermined angle as the stoppers 18 limits the opening angle, so that the door 10 guides the airbag 4 downward to expand along the interior panel 36. Therefore, the airbag 4 is inflated and deployed in a space near the knees and the leg portions under the knees of the vehicle occupant, thereby protecting the lower legs of the vehicle occupant from colliding with the interior panel 36.

When the door 10 is opened by the inflation of the airbag 4, the left and right sidewall portions 16 are brought to the front side of the cover 8 together with the door 10. The sidewall portions 16 project like walls from the front face of the cover 8 so as to guide the airbag 4 being inflated along the both-lateral sides of the sidewall portions 16. Therefore, the airbag 4 is prevented from excessively inflated in the lateral direction of the airbag 4, whereby the airbag 4 can be smoothly inflated and deployed to the front side of the interior panel 36.

In this protection device 1, both the sidewall portions 16 and the stoppers 18 are disposed on the door 10, so they can be integrally formed, for example, by molding a synthetic resin. This extremely simplifies a structure of the protection device 1 and thus extremely facilitates the assembly.

Although each of the stoppers 18 is composed of the plate portion 20 to contact the backside of the cover 8 and the rib portions 22 supporting the plate portion 20 in the embodiment, the structure of the stopper is not limited thereto.

The present invention can be applied to other protection devices for occupants in various vehicles, besides a leg protection device for a front passenger of an automobile shown in the embodiment.

As described above, the present invention can provide a vehicle occupant protection device in which structure is simple and can be easily assembled, and which allows extremely smooth inflation of its airbag.

While the invention has been explained with reference to the specific embodiments of the invention, the explanation is illustrative and the invention is limited only by the appended claims.

What is claimed is:

1. A vehicle occupant protection device comprising:

a gas generator to be attached to a vehicle for generating gas, an airbag communicating with the gas generator for receiving the gas therefrom for inflation, a door disposed in front of the airbag, and having a hinge portion creating, upon inflation of the airbag, an opening through which the airbag expands, a backside, and a side wall projecting rearwardly from the backside and located at an inner side for the opening, and a stopper disposed on the sidewall to extend laterally outwardly therefrom beyond the opening, said stopper being located away from the hinge portion and away from the backside with a predetermine distance so that upon inflation of the airbag, the door is opened together with the side wall by bending the hinge portion, and the stopper engages and abuts against an edge of the opening not bent by the inflation of the airbag for limiting an opening angle of the door through the hinge.

2. A vehicle occupant protection device according to claim 1, wherein said stopper includes a plate portion to abut against a backside of the edge of the opening, and a rib portion attached to the plate portion for supporting the same.

3. A vehicle occupant protection device according to claim 1, wherein said airbag is a leg protecting bag for expanding near legs of the vehicle occupant for protecting the same.

4. A vehicle occupant protection device according to claim 1, wherein said door has a tear line at lower, left and right edges, said hinge portion being formed at an upper edge opposite to the lower edge to create the opening facing downward.

5. A vehicle occupant protection device according to claim 4, wherein said sidewall disposed on the backside of the door extends along the left, right and upper edges of the door, said stopper having stopper members disposed on left and right sides of the sidewall and extending perpendicular and outwardly therefrom.

6. A vehicle occupant protection device according to claim 5, wherein said door is a part of a cover surrounded by the tear line.

7. A vehicle occupant protection device according to claim 4, wherein said tear line and hinge portion form the opening, and said stopper crosses the tear line.

* * * * *